United States Patent Office 3,418,689
Patented Dec. 31, 1968

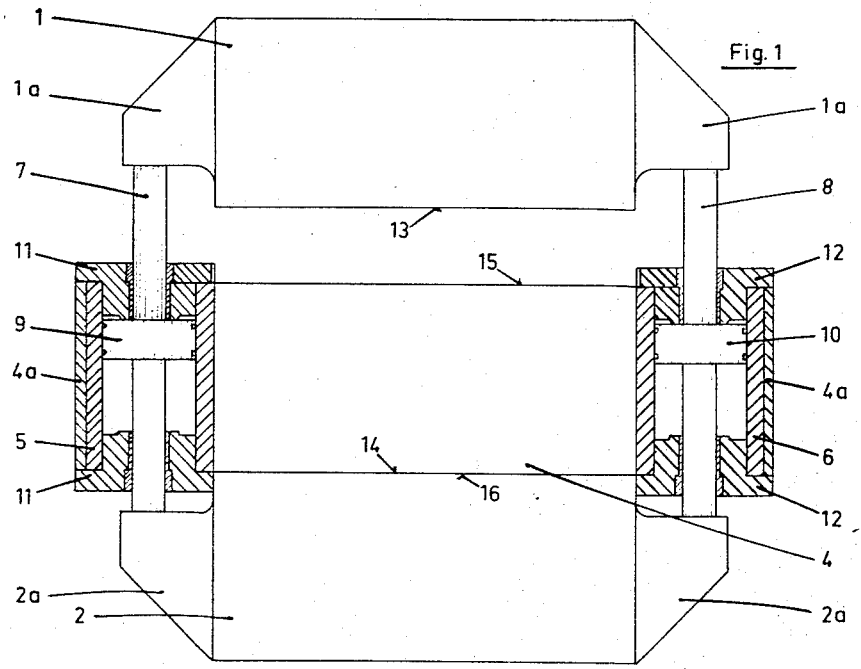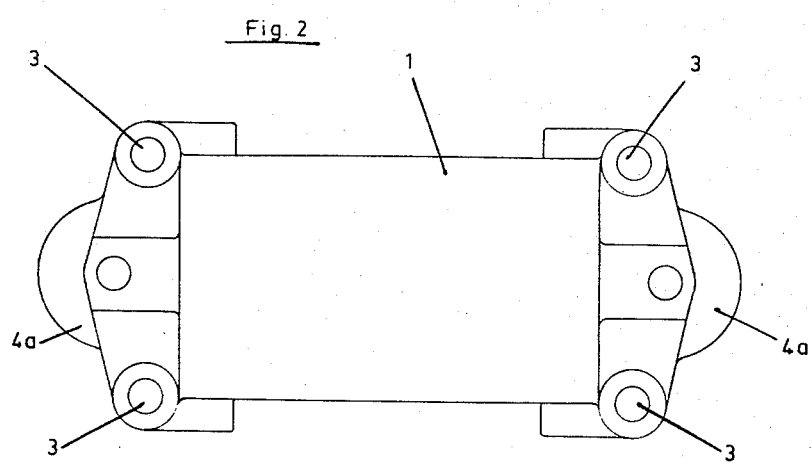

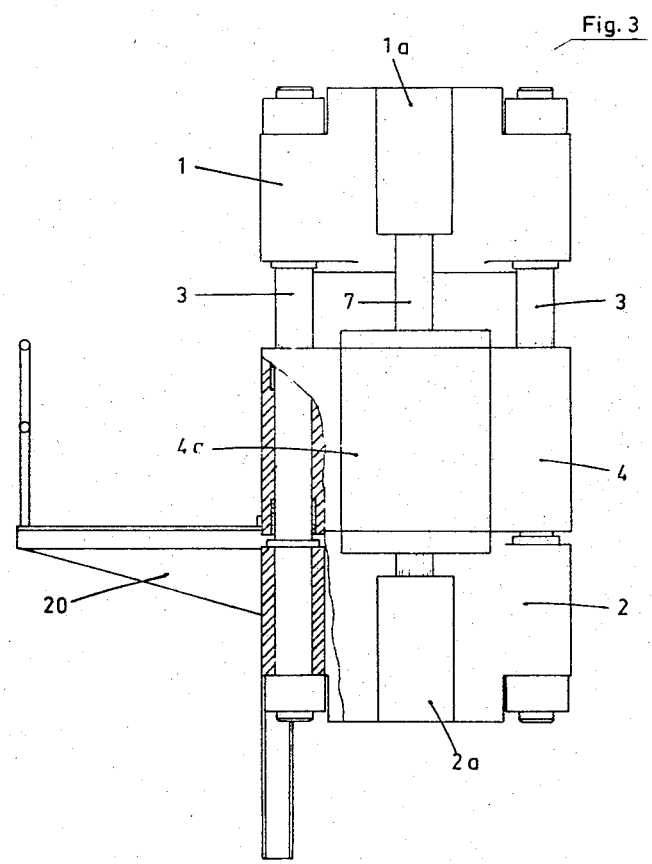

3,418,689
HYDRAULIC FORMING OR INJECTION PRESS FOR MOLDING SYNTHETIC MATERIALS
Otto Karl Buchheit, St. Ingbert, Germany, assignor to Verwaltungsgesellschaft Moeller und Neumann offene Handelsgesellschaft, St. Ingbert (Saar), Germany
Filed Oct. 24, 1966, Ser. No. 589,055
Claims priority, application Germany, Oct. 22, 1965, V 29,575
6 Claims. (Cl. 18—16)

This invention relates to a hydraulic forming or injection press of the vertical or horizontal type for molding synthetic or plastic materials comprising columns supporting outer cross-beams between which a pressing plate is guided by means of a hydraulic drive in both directions.

It is an object of the invention to increase the capacity of the press which is limited during the manufacture of press molded or injection molded parts of a thermosetting or self-hardening plastic type due to the unavoidable baking or hardening times in reference to the wall thickness of the parts to be produced. It is known to increase the production of hydraulic presses for synthetic parts by means of more than one circulating form which after the pressing operation, are kept outside the press in a locked condition during the baking time. This process is not used within the scope of this invention but instead the purpose is to provide in the same press a coincidence of the baking times and the idle time, the latter consisting of the time for the charging, the closing, the opening, the removal from the press and the cleaning.

According to the invention hydraulic drives are provided at opposite sides of the pressing plate for moving the pressing plate in both direction and the opposite face surfaces of the cross-beams as well as the two surfaces of the pressing plate facing the cross-beams are designed as tool support for receiving alternately chargeably pairs of forms. Due to the fact that the hydraulic drives are mounted laterally, an arrangement which is known in column presses, the surfaces for the pressing plate which face each other in pairs on the one hand and of the two outer cross-beams on the other hand are free to allow the arrangement constituting the essence of the invention which resides in using the free surfaces as tool supports for two pairs of molding forms.

The invention provides thus what may be called a double press which may be distinguished from other presses by the fact that during the exchange while one form is introduced the other form is closed for the pressing operation. During the subsequent baking time of the closed form the pressed part which has been laid open in the other form may be removed and the form may be cleaned and charged again. Each stroke of the pressing plate is thus a work stroke.

The greatest production increase is obtained when the baking time is equal to the idle time. The production increase is reduced in proportion to the difference of the baking time and the idle time but is always available in the case of a relatively long baking time. When the idle time is longer than the baking time one obtains instead of the maximum possible production increase of 100% an improvement of the surface condition of the pressed parts because in this case the baking time is extended of necessity beyond the required amount.

An essential advantage of the press according to the invention consists in that the production increase is obtained with the same amount of working space which is required with a normal press. Furthermore the price for the double press according to the invention is only slightly higher than that of a normal press because the form carrying center cross-beams or pressing plate must be constructed so as to resist bending in both directions and additionally two table surfaces must be provided each for one half of the second form pair.

In the case of an upright press the same work team can service both form pairs if according to the invention a work platform, which may be raised and lowered, is provided with a drive for the alternate adjustment to the working level corresponding to the alternating operation of the form pairs. The raising and lowering drive for the working platform can be derived in a very simple manner over a lever linkage, with a reversal of the direction of movement, from the movements of the pressing plate so that the working platform is lowered when the pressing plate moves upward to close the upper form pair, and vice versa.

In the case of horizontal presses in which the invention finds mainly application for injection molding presses, a working platform which is arranged to travel lengthwise of the press, may be provided and this platform could also be operated by deriving its movements from those of the pressing plate.

An embodiment of an upright hydraulic press according to the invention is illustrated in the drawing in which:

FIG. 1 is a side view with a section through the two lateral hydraulic drives,

FIG. 2 is a top view of the press according to FIG. 1,

FIG. 3 is a view of the narrow side of the press, with a portion broken away to show a tension rod.

Figure 4:
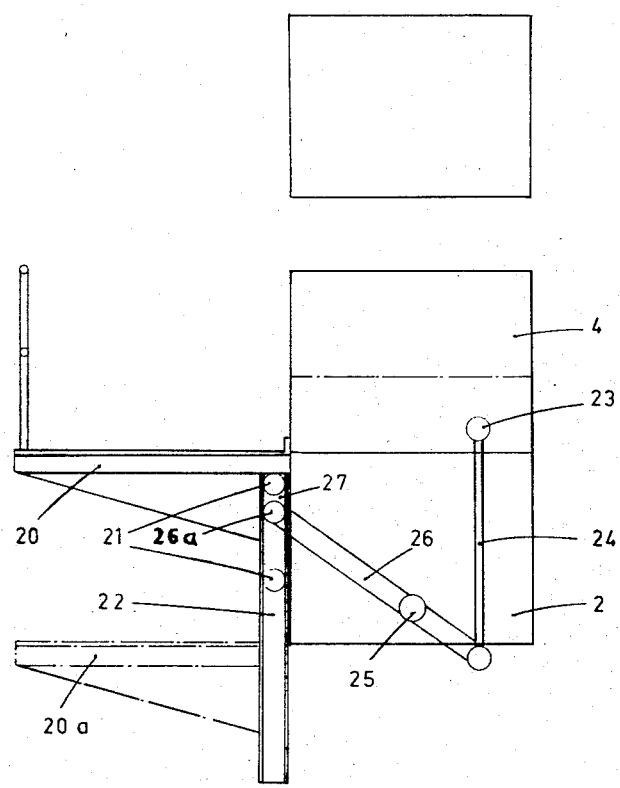
FIG. 4 shows the control arrangement of a lifting and lowering platform also illustrated in FIG. 3.

The press consists of the two outer cross-beams 1 and 2 interconnected through the four tension rods 3. A pressing plate 4 is movably guided on the tension rods. The laterally disposed hydraulic drives consist according to the invention of two floating cylinders 5 and 6 arranged on the movable pressing plate 4, and the fixed piston rods 7 and 8 are supported in side pieces 1a and 2a of the outer cross-beams 1 and 2. The pistons 9 and 10 of the piston rods having equal piston surfaces are pressure contacted on both sides for producing equal forces in each direction. The cylinders 5 and 6 are releasably set in eyes 4a of the pressure plate 4 and restricted in their movement by the cylinder covers 11 and 12. The piston rods 7 and 8 may be set into the side pieces 1a and 2a of the outer cross-beams but it is recommended to provide the piston rod ends with round extremities which bear against plane support surfaces of the cross-beams 1 and 2. In this manner the piston rods 7 and 8 may follow any bending actions to which the pressing plate 4 may be subjected, so that the drive cylinders 5 and 6 may also assume a slanted position to avoid an increased collar friction at the pistons 9 and 10.

The opposed surfaces 13 and 14 of the outer cross-beams 1 and 2 as well as the surfaces 15 and 16 of the pressing arm 4 facing the cross-beams are designed according to the invention as tool supports for receiving two alternately chargeable form pairs (not shown). In the lower position of the pressing plate 4 illustrated in FIGURE 1 a form attached to the surfaces 14 and 16 is closed while a form attached to the surfaces 13 and 15 is opened. While the lower form is maintained closed during the baking time the pressed part may be removed from the upper form and the form may be cleaned and charged again. When the upper form is ready for the pressing operation and the baking time for the lower form is terminated, the pressing plate 4 is raised and carries out the working stroke relative to the upper form and provides simultaneously a releasing stroke relative to the lower form. For both directions of movement of the pressing plate 4 the same pressing force furnished by the hydraulic drives is available.

The double acting operation of the press according to the invention requires a construction in which not only the pressing plate 4 but also the outer cross-beams 1 and 2 are designed to be very resistant to bending stresses.

In FIGURE 3 and particularly in FIGURE 4 a working platform 20 is illustrated which may be adjusted to various levels and this platform extends across the length of the press and travels over rollers 21 in two lateral U-shaped rails 22. The lifting and lowering drive for the working platform 20 is derived from the movements of the pressing plate 4 in that on the two small sides of the pressing plate 4 an oscillating link 24 is pivotally connected at 23 and this link is also pivotally connected to a two arm lever 26 mounted at 25 on the lower cross-beam. The other lever arm of the two arm lever 26 is attached over a bar 27 mounted in the axis of the upper guide roller 21 to the platform 20. This bar 27 is required because the end 26a of the two arm lever 26 describes a circular arch around the fixed point 25 while the guide rollers 21 travel vertically in a straight line.

The lever linkage provided on both sides of the press constitutes a drive for the lifting platform 20 which is derived from the movements of the pressing plate 4 with a reversal of the direction of movement. When the pressing plate 4 rises from the position illustrated the lifting platform 20 is lowered into the dash and dot outline position 20a in which it is located at the working level corresponding to the lower pair.

What is claimed is:

1. Hydraulic press for a forming and injection press to mold synthetic materials comprising columns supporting outer cross-beams and a pressing plate mounted between the cross-beams and movable in opposite directions by a hydraulic drive characterized in that hydraulic drives (5-10) are provided at opposite sides of the pressing plate (4), and that the opposed surfaces (13, 14) of the cross-beams (1, 2) as well as of the opposite surfaces (15, 16) of the pressing plate facing the two cross-beams are constructed as tool supports to receive two alternately loaded form pairs.

2. The press according to claim 1 characterized in that the hydraulic drives consist of two floating cylinders (5, 6) mounted on the movable pressing plate (4) and receiving fixed piston rods (7, 8) supported on the cross-beams (1, 2), the pistons (9, 10) having equal surfaces being pressure contacted on both sides.

3. The press according to claim 2 characterized in that the cylinders (5, 6) are releasably mounted and contained in eyes (4a) of the pressing plate.

4. The press according to claim 2 characterized in that the piston rod ends have round terminal surfaces which bear against plane support surfaces of the cross-beams (1, 2).

5. The press according to claim 1 characterized in that a vertically adjustable working platform (20) is provided with a drive for alternately adjusting the platform to the working level corresponding to the alternate operation of the form pairs.

6. The press according to claim 5 characterized in that the vertical adjustment of the platform is derived from the movements of the pressing plate (4) over a lever linkage (24, 26, 27) by a reversal of its direction of movement.

References Cited

UNITED STATES PATENTS

| | | |
|---|---|---|
| 1,800,844 | 4/1931 | Stacy. |
| 2,331,015 | 10/1943 | Dawes et al. |
| 2,748,434 | 6/1956 | Arno. |
| 3,050,778 | 8/1962 | Jurgeleit. |
| 3,128,501 | 4/1964 | Borah. |

FOREIGN PATENTS

| | | |
|---|---|---|
| 891,320 | 12/1943 | France. |

J. HOWARD FLINT, JR., *Primary Examiner.*